United States Patent
Gul et al.

[11] Patent Number: 5,927,682
[45] Date of Patent: Jul. 27, 1999

[54] ROTARY DRIVE COUPLER FOR ACTUATED VALVE

[75] Inventors: Asim Gul, Orono; Doug Jacob Kluge, Clearwater; Glenn Martin Campbell, Maple Grove, all of Minn.

[73] Assignee: Mamac Systems, Inc., Eden Prairie, Minn.

[21] Appl. No.: 09/009,011

[22] Filed: Jan. 16, 1998

[51] Int. Cl.⁶ .................................................. F16K 31/528
[52] U.S. Cl. ............................................. 251/77; 464/104
[58] Field of Search ........................ 257/77, 76; 464/102, 464/104, 105

[56] References Cited

U.S. PATENT DOCUMENTS

| | | | |
|---|---|---|---|
| 2,065,648 | 12/1936 | Rime-Bruneau | 464/105 |
| 2,535,338 | 12/1950 | Wilcox | 464/105 |
| 3,789,627 | 2/1974 | Smith | 464/105 |
| 4,296,913 | 10/1981 | Hoyer | 251/77 X |
| 4,429,704 | 2/1984 | Jones | 251/76 X |
| 4,442,996 | 4/1984 | Erwin | 251/77 X |
| 4,565,539 | 1/1986 | Cook | 464/179 X |
| 5,236,006 | 8/1993 | Plautisch et al. | 137/375 X |

*Primary Examiner*—Stephen M. Hepperle
*Assistant Examiner*—John Bastianelli
*Attorney, Agent, or Firm*—Kinney & Lange, P.A.

[57] ABSTRACT

A rotary-driven valve is coupled to a rotary actuator. The coupling includes a shaft having longitudinally extending drive pins offset from the shaft axis. The drive pins contact drive surfaces of drive plates which have a valve stem opening which mates with the valve stem. The drive plates can slide relative to the valve stem with one degree of freedom, and the drive pins can slide relative to the drive plates with a second degree of freedom. Sliding movement of the first drive plate and/or the second drive plate allow the shaft axis to be angled and/or laterally displaced relative to the valve stem axis. The drive plates provide a dynamic adjustment freedom so bending moments and radial forces are not imposed on the valve stem. The drive plates may also provide thermal insulation between the valve stem and the actuator.

20 Claims, 6 Drawing Sheets

ROTARY DRIVE COUPLER FOR ACTUATED VALVE

CROSS-REFERENCE TO RELATED APPLICATION(S)

None.

BACKGROUND OF THE INVENTION

The present invention relates to actuators for valves, and, more particularly, to coupling systems used to connect rotary position actuators with rotary controlled valves.

Numerous types of valves exist to turn fluid flow on and off and regulate fluid flowrates within a piping system or flow conduit. Some valves restrict flow with an axial movement or displacement of a valve element within the housing or valve body. For instance, most spool valves and globe valves restrict flow with an axial displacement of a needle, plug or spool within the valve body. The force causing the displacement of the valve element may be provided in a number of ways, such as with hydraulic, pneumatic or other pressure control on a different portion of the valve element. Other valves operate based on a rotary movement or pivoting of a valve element relative to the housing. For instance, many ball valves and rotary valves operate based on a rotating a ball or spool relative to the housing without any displacement between the two. Even with displacement type valves, the axial displacement may occur as a result of a screw threaded advance, and thus adjustment of the valve occurs primarily due to a rotary control motion. The present invention is applicable to all types of rotary controlled valves, and particularly applicable to rotary control valves without axial displacement, such as ball valves.

Within the past several decades it is become common to employ automated control systems to operate valves rather than requiring manual control. The automated control systems include an actuator for each valve in the system. The actuator may include an electrically powered motor or solenoid which controls the position of the valve element based on electrical input to the actuator.

With some valves such as most globe valves, the flow through the valve is directly, linearly proportional to the position of the valve element. With other types of valves, such as most ball valves, flow has a non-proportional relationship to the angular position of the ball. Early on in the use of automated control systems, proportional valves were used for all instances when flowrates had to be controlled, and non-proportional valves were used for instances when flow between open and shut positions was sufficient. More recently, pressure and flow sensing devices have become more sophisticated and have enabled fine tuning of non-proportional valves using downstream feedback. With use of downstream pressure or flow feedback, non-proportional valves may now also used in providing controlled flowrates.

Often it is desired to retrofit existing piping systems to include an automated control system. The retrofit involves adding actuators to open, close and/or adjust valves in place of previous manually moved handles.

Particularly when retrofitting a valve in an existing piping system with an actuator, it is difficult to precisely align the actuator with the stem of the valve. Misalignment may occur with a displacement component, when the shaft coupling the actuator to the valve is displaced from the axis of the valve stem, even through the shaft axis is parallel to the valve axis. For instance, some valves already include a flange with threaded holes to facilitate mounting of a handle or other external device, and the flange may be used for mounting of the actuator. However, the valve stem axis may not be exactly centered between the threaded holes on the flange. Misalignment may also occur with an angular offset, when the shaft coupling the actuator to the valve stem is disposed at an angle to the valve stem. For instance, the plane formed by the flange may not be exactly perpendicular to the valve stem axis. Some valve stems include flats to facilitate rotating the valve stem, but these flats may not be entirely parallel to each other and equally spaced on opposite sides of the valve stem axis. The valve stem itself may not be aligned with the axis of rotation of the valve element, and may not perfectly rotate about its axis. Any of these problems can result in misalignment between the actuator and the valve stem. Some misalignments include both a displacement component and an angular offset component.

When the valve is manually turned, these existing inaccuracies may not pose major problems. Manual handles are typically mounted directly to valve stems, limiting the effect of any angular offset. The manual handle is left free for grasping, and rarely transmits a residual stress. Forces transmission to the valve stem is generally not exactly reproduced from rotation to rotation, so any wear problems associated with misalignment are not focused at a particular location. Manual turning also has a great capacity to adjust the turning torque appropriately for the turning force required.

In contrast, when an automated control system with an actuator is used to turn the valve, any misalignment between the shaft and the valve stem becomes more significant for a number of reasons. First, the shaft extends the valve stem a significant distance, and any angular offset at the valve stem results in a large difference at the actuator. A longer distance between the actuator and the valve stem and a longer shaft for turning the valve stem exacerbates the displacement problems and particularly angular misalignment problems. Second, in contrast to the manual handle, the shaft does not terminate in a free end, and misalignment will often result in a residual stress or bending moment on the valve stem. That is, if the shaft is misaligned to place a bending moment on the valve stem, that bending moment will be constant, and will not relax just because the valve is not being moved. Third, the actuator places forces on the valve stem which are exactly reproduced for each turning of the valve stem, resulting in more focused wear problems. Fourth, if the valve stem itself does not rotate perfectly about its axis, the shaft may place a bending moment on the valve stem with a magnitude that changes upon the rotational location of the valve. For instance, the valve stem may be fairly free of residual stress when the valve is closed, but have a severe bending moment when the valve is open. Fifth, because the automated control system is intended to more tightly control of the flow through of the piping system, the valve is likely to be operated much more frequently.

The resulting misalignment can cause a variety of problems in the piping system and/or the automated control system. As the valve stem is repeatedly and continually stressed over time, the valve stem may warp or be broken off entirely, rendering the valve unworkable. If the automated control system does not have feedback sensors in place, such breakage may not be readily identified, and the actuator may continue to turn the shaft even though the valve element is not being moved. More likely than breakage, the seals around the valve stem are likely to wear excessively and start leaking. If the shaft "binds" or torques differently depending on the position of the valve, the actuator may have trouble turning the shaft, or may not turn the shaft an appropriate amount corresponding to the input signal.

BRIEF SUMMARY OF THE INVENTION

The present invention is a rotary drive coupler between an actuator and a rotary controlled valve to overcome these shortcomings. The rotary drive coupler includes a shaft rotated by the actuator having at least one drive element extending longitudinally and offset relative to the shaft axis. The rotary drive coupler also includes at least one and preferably two or more drive plates. The drive plates have a valve stem opening which mates with the valve stem and allows sliding parallel to the valve stem flat. The drive plates also have a drive surface which permits sliding of the drive element relative to the drive plates. The sliding movement of the drive plate relative to the valve stem and of the drive element relative to the drive plate allows the shaft axis to be dynamically misaligned relative to the valve stem axis.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
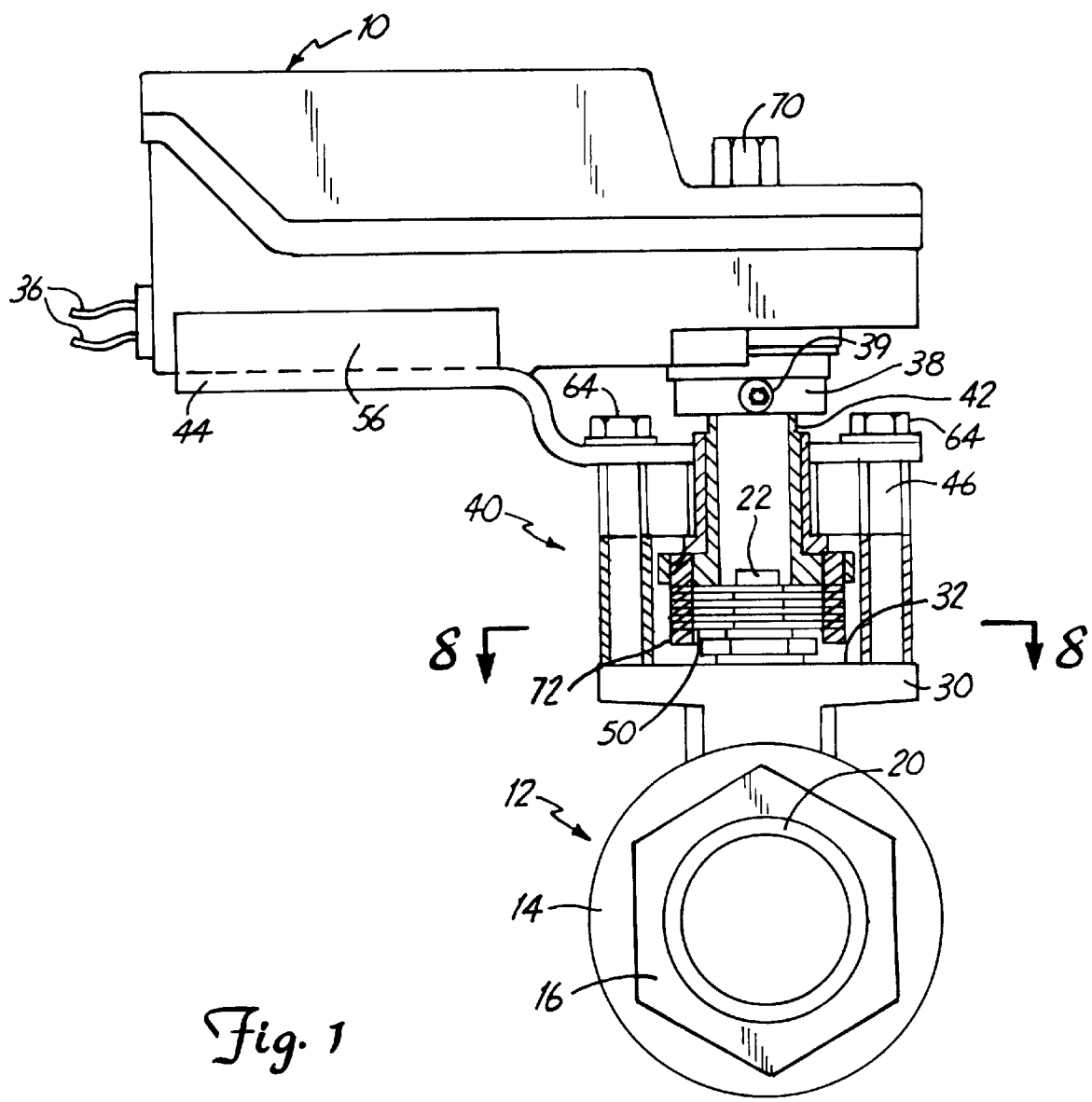
FIG. 1 is a side view of an actuator coupled to a rotary valve in accordance with the present invention, showing the rotary drive coupler in cross-section.
Figure 2:
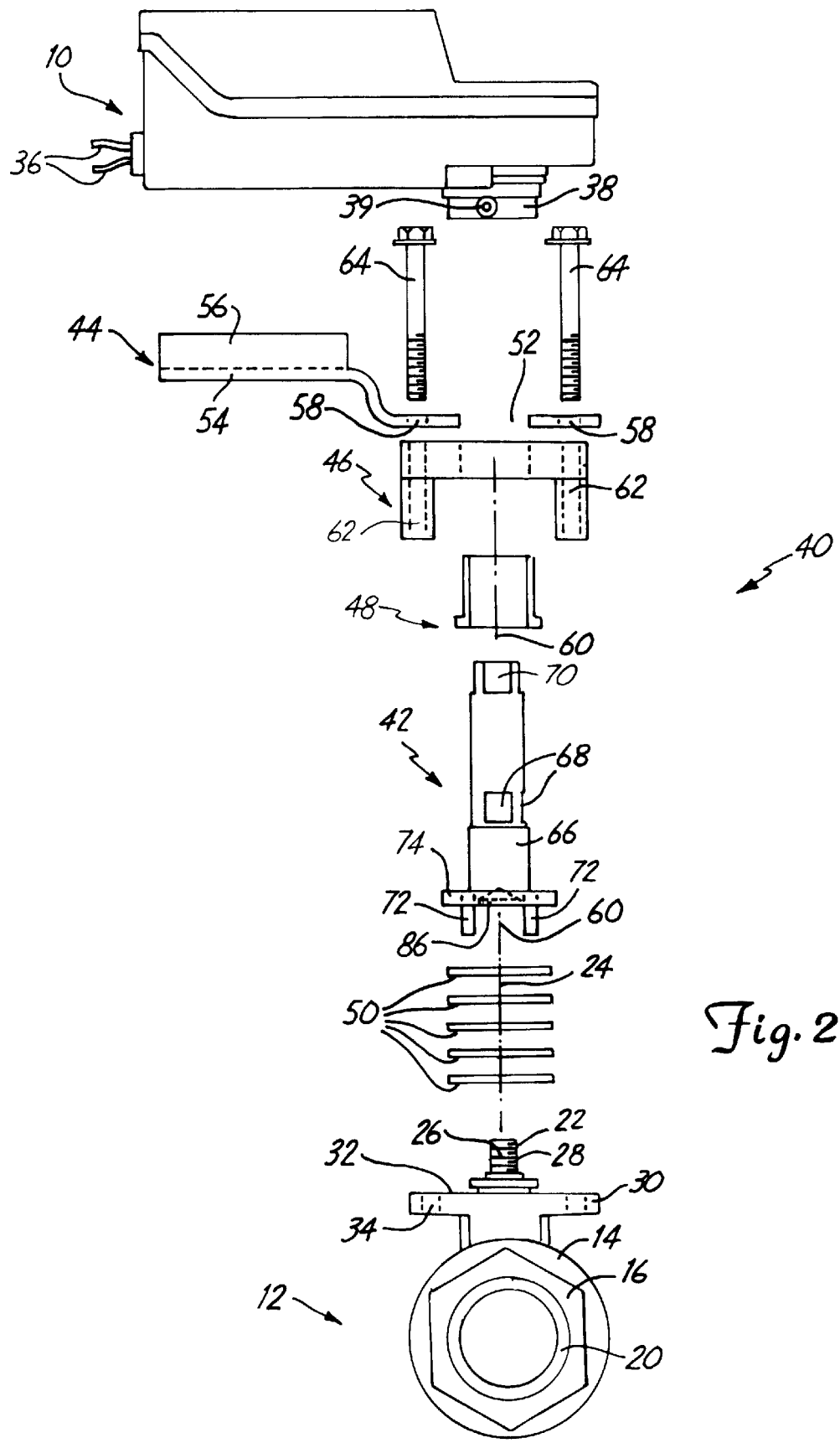
FIG. 2 is an exploded view of FIG. 1.
Figure 3:
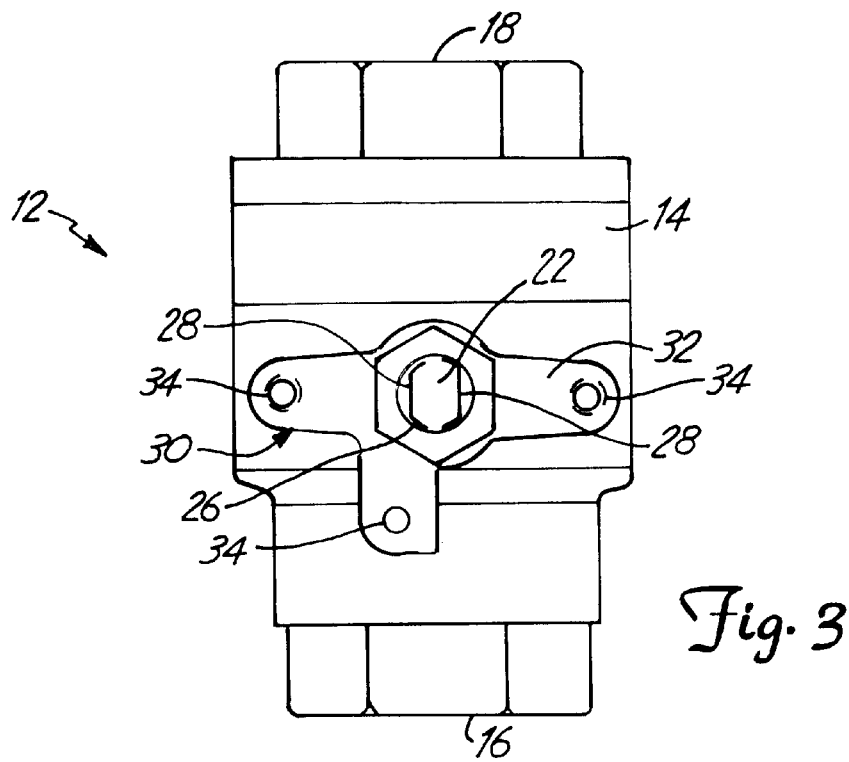
FIG. 3 is a plan view of the valve of FIGS. 1 and 2.

The present invention includes an actuator 10 and a valve 12 as known in the art and exemplified in FIGS. 1–3. The valve 12 includes a housing or valve body 14 with at least one inlet port 16, at least one outlet port 18, and an interior flow path from the inlet port 16 to the outlet port 18. A valve element such as a ball 20 intermittently blocks the flow path based upon rotation of the ball 20 in the housing 14. The ball 20 has a hole extending therethrough, which permits flow if longitudinally aligned with the pipe, and which is closed if turned at a 90° angle to the pipe direction. Alternatively, the valve element could be a needle, plug, spool or other element which restricts flow based on its position in the housing.

A valve stem 22 is rigidly attached to the ball 20. The valve stem 22 extends outside the valve body 14 for rotation of the ball 20. The valve stem 22 has an axis 24 which is simultaneously (a) perpendicular to the pipe direction, (b) intersecting the axis of the pipe, and (c) intersects the center point of the ball 20. Ideally each of these three relationships is exact, however in production the valve stem 22 may be slightly misplaced from its ideal position in any or all of these three respects. The valve stem 22 is sealed relative to the valve body 14 to prevent leakage of fluid.

The valve stem 22 may include a threaded portion 26 and may also include at least one flat 28. More commonly, two flats 28 are provided on the valve stem 22. The flats 28 are ideally both exactly equally spaced from the valve stem axis 24 and exactly parallel to each other, however in production one or both flats 28 may be slightly misplaced from their ideal relationship relative to the valve stem axis 24.

A flange 30 may be included on the valve body 14 for attachment of exterior components to the valve 12. The flange 30 includes an attachment surface 32 which is generally flat and perpendicular to the valve stem axis 24. Ideally the attachment surface 32 is exactly perpendicular to the valve stem axis 24, however in production the attachment surface 32 may be slightly misplaced from its ideal alignment. The flange 30 includes at least one bolt hole 34. More commonly, two or three threaded bolt holes 34 are spaced around the valve stem 22. Ideally the valve stem axis 24 is aligned exactly between and exactly centered with respect to at least two of the bolt holes 34, however in production one or more of the bolt holes 34 may be slightly misplaced from their ideal alignment relative to the valve stem axis 24.

The actuator 10 may be a standard actuator as known in the art. The actuator 10 includes electrical leads 36 for control of the actuator 10. The actuator 10 includes a collar portion 38 which may have a set screw 39 or other shaft attachments means as known in the art. The actuator 10 also includes a gearing system and an electric motor disposed within its housing. The electric motor is coupled through the gearing system to torque and rotate the collar 38.

The coupler 40 of the present invention preferably includes a shaft 42, a bracket 44, a standoff 46, a bearing hub 48 and one or more drive plates 50. The bracket 44 includes a shaft hole 52, a shelf 54 for positioning of the actuator 10, and guides 56 extending at an angle to the shelf 54. The bracket 44 is preferably sized to receive the actuator 10 between the guides 56 and to support the actuator 10 relative to the valve 12. With the shelf 54 and the guides 56, the bracket 44 positions and aligns the collar 38 of the actuator 10 relative to the shaft hole 52, allowing only longitudinal sliding of the actuator 10 relative to the shaft hole 52. The actuator collar 38 is further aligned with regard to the shaft 42 during assembly of the actuator 10 to the valve 12 using the coupling system 40.

Figure 4:
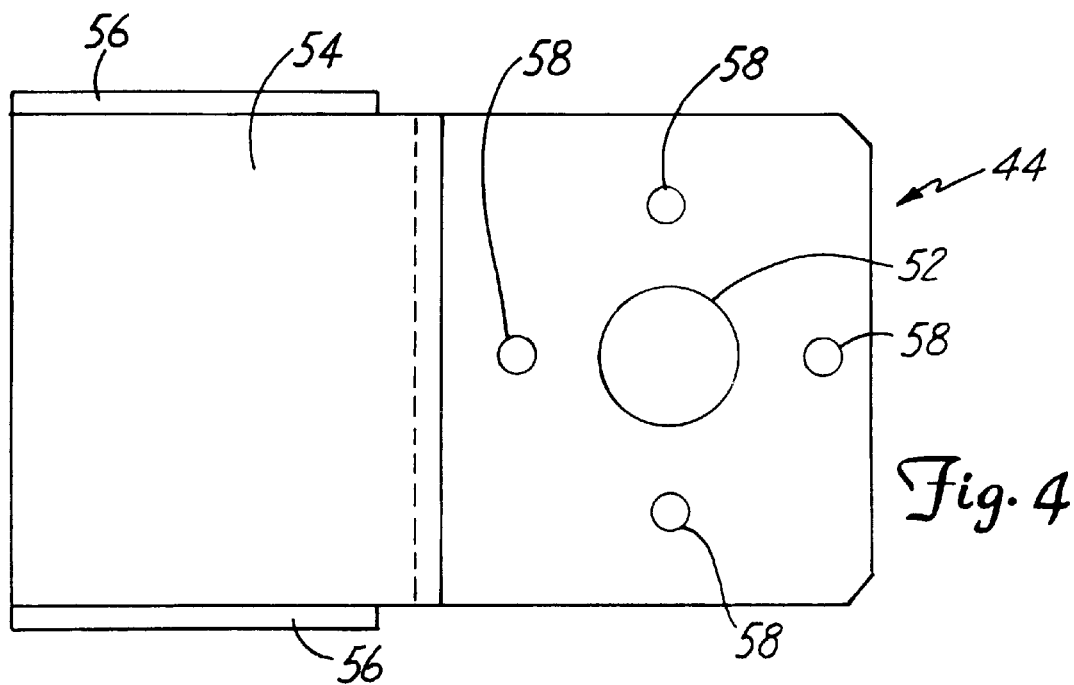
FIG. 4 is a plan view of the bracket of FIGS. 1 and 2.

The bracket 44 includes a plurality of mounting holes 58, which preferably mate opposite a plurality of the bolt holes 34 in the valve flange 30. With four mounting holes 58 as shown in FIG. 4, the bracket 44 can be mounted relative to the valve 12 in any four positions (i.e., at three, six, nine and twelve o'clock relative to the pipe direction). Alternatively, the bracket 44 may include two, three, six, eight, etc. mounting holes 58 to allow the appropriate freedom in mounting the bracket 44 relative to the valve flange 30. The bracket 44 is preferably bent and machined out of sheet metal. Workers skilled in the art will appreciate that many types of brackets will adequately support and hold the actuator 10.

The bearing hub 48 may be used with the bracket 44 to facilitate rotation of the shaft 42 relative to the bracket 44. The bearing hub 48 includes a circular bearing surface which mates with the circular outside surface 66 of the shaft 42 and defines the shaft axis 60. Both the bearing 48 and the standoff 46 may be integral with the bracket 44 but preferably are separate units to aid in ease of manufacturing. The bearing 48 may be formed such as out of oil impregnated bronze or other low friction metal. Workers skilled in the art will appreciate that many types of bearings can be used to facilitate low friction rotation.

Figure 5:
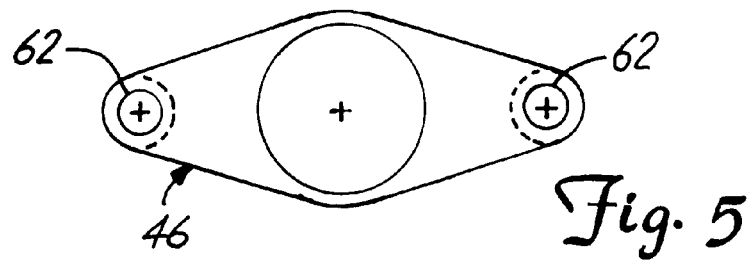
FIG. 5 is a plan view of the offset of FIGS. 1 and 2.

The standoff 46 includes at least two spacer holes 62 (FIG. 5) which are sized to receive bolts 64 and extend between the mounting holes 58 in the bracket 44 and the threaded bolt holes 34 in the flange 30. The standoff 46 and bracket 44 are thus connected with bolts 34 to the valve flange 30. With the connection provided by the standoff 46, the shaft 42 will be oriented perpendicular to the flange surface 32 and centrally aligned with respect to the threaded bolt holes 34, even though such orientation may place the shaft 42 out of alignment with the valve stem axis 24. The standoff 46 may be formed such as out of relatively incompressible plastic or an aluminum extrusion. Workers skilled in the art will appreciate that many standoff structures can be used to position the actuator 10 relative to the flange 30 or other structure of the valve 12.

The shaft 42 includes a circular bearing surface 66 and a flat 68 for receiving the set screw 39. Preferably at least two flats 68 are provided at 90° to one another on the shaft 42 about the shaft axis 60. The two flats 68 allow the shaft 42 to be selectively positioned between a normally open and a normally closed position with respect to the actuator 10 and the valve 12.

The shaft 42 preferably extends beyond the actuator 10 to a head 70, allowing attachment of a standard tool for manual rotation of the shaft 42 if necessary. The actuator 10 may have an override switch (not shown) which disenables the gearing system and allows the manual rotation of the shaft 42 to occur more easily. The shaft 42 may be formed such as of stainless steel.

The shaft 42 includes at least one drive element, and more preferably includes two or more drive elements such as drive pins 72. The drive pins 72 may be formed integrally with the shaft 42, but preferably are separately formed and then rigidly attached to the shaft 42 to reduce the cost of manufacture. Workers skilled in the art will appreciate that many shapes of drive elements will be effective with the present invention.

Figure 6:
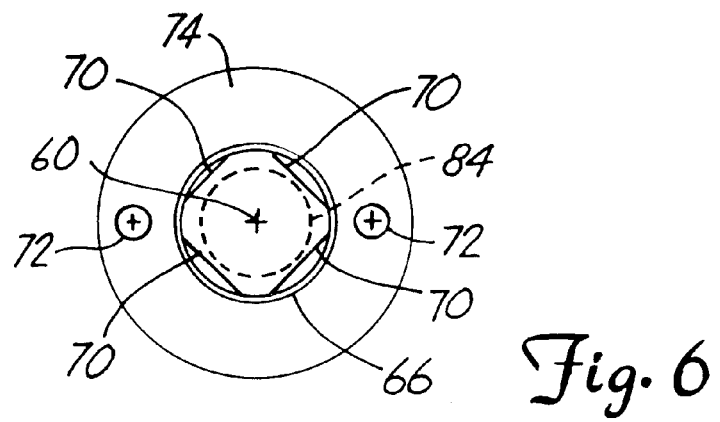
FIG. 6 is a plan view of the shaft of FIGS. 1 and 2.
Figure 7:
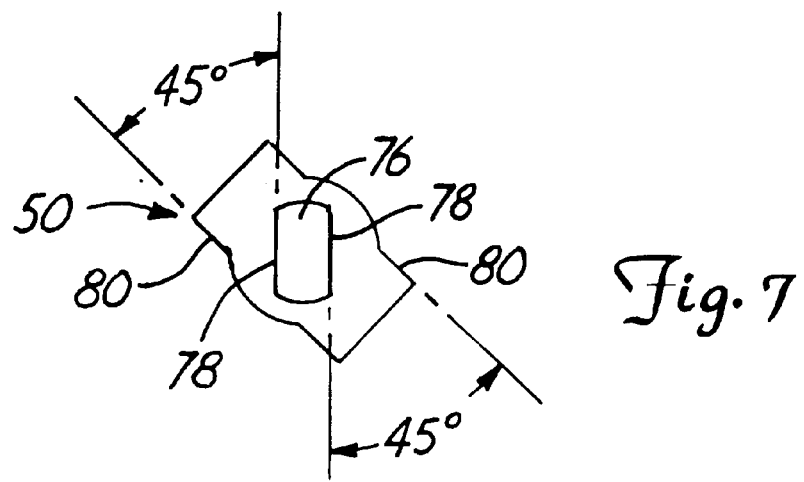
FIG. 7 is a plan view of one drive plate of FIGS. 1 and 2.

The drive pins 72 are used to transfer torque from the shaft 42 to the valve stem 22 through the drive plates 50. The drive pins 72 extend longitudinally relative to the shaft 42, preferably beyond the end of the shaft 42. For instance, the drive pins 72 may extend about ⅜ to ½ inch beyond the end of the shaft 42. The drive pins 72 are offset relative to the shaft axis 60 by a moment arm distance. The moment arm should be at least greater than the radius of the valve stem 22 so the drive pins 72 are positioned around the valve stem 22 without contacting the valve stem 22 or interfering with the valve stem 22. The drive pins 72 are preferably aligned parallel to the shaft axis 60, and therefore have the same moment arm along the entire length of the drive pins 72. For instance, in the preferred embodiment best shown in FIGS. 2 and 6, the shaft 42 includes a flange portion 74 for attachment of the drive pins 72. The flange portion 74 aligns and holds the drive pins 72 so they extend parallel to the shaft axis 60 and about ⅔ inch away from the shaft axis 60.

With multiple drive pins 72 equally spaced from the shaft axis 60 (i.e., each having the same length moment arm), and all circumferentially spaced equally about the shaft axis 60 (i.e., two drive pins 72 spaced at 180° intervals), torque is smoothly transferred from the shaft 42 without transferring any net force. If three drive pins 72 are used, they should be spaced at 120° intervals, four drive pins 72 should be spaced at 90° intervals, etc.

At least one drive plate 50 is positioned on the valve stem 22. Preferably at least two, and more preferably four or more drive plates 50 are simultaneously used. As shown in FIGS. 7–10, each drive plate 50 includes an opening 76 having at least one flat 78 and preferably two flats 78. The drive plate opening flats 78 mate with the flats 28 of the valve stem 22. The drive plate opening 76 is longer than the diameter of the valve stem 22, giving the plate 50 a degree of adjustment freedom in a direction parallel to the flat 78. That is, the drive plate 50 is free to dynamically slide back and forth relative to the flat or flats 28 of the valve stem 22. The valve stem openings 76 preferably permit sliding motion of the drive plates 50 of at least 0.03 inches relative to the valve stem axis 24. For instance, the drive plate opening 76 may allow the drive plate 50 to slide a distance of about 0.2 inches relative to the valve stem axis 24.

The drive plate 50 includes one or more drive surfaces 80 which are each generally in position to contact one of the drive pins 72. Preferably two drive surfaces 80 are provided on each drive plate 50, to mate with the two drive pins 72. If more that two drive pins 72 are used, the number and circumferential positions of the drive surfaces 80 are changed correspondingly. The drive surfaces 80 extend across a moment arm which is generally about the same length as the moment arm of the drive pins 72. For instance, if the drive pins 72 are spaced ⅔ inches from the shaft axis 60, the drive surfaces 80 will be edges of the drive plates 50 which extend a radial distance from about 0.5 to 0.8 inches from the center of the drive plate opening 76.

With the dynamic adjustment freedom of the drive plate 50, the drive surfaces 80 will retain contact with the drive pins 72 even though the shaft 42 is offset relative to the valve stem 22, so long as the offset is not too great for the amount of dynamic adjustment freedom. The term "dynamic" is used because the drive plates 50 can slide relative to the valve stem 22 and the drive pins 72 can slide relative to the drive plates 50 during rotation. This potential sliding during rotation in two degrees of freedom not only allows misalignment between the shaft axis 60 and the valve stem axis, but also allows the amount of misalignment to change during rotation without affecting the transfer of torque.

Figure 8:
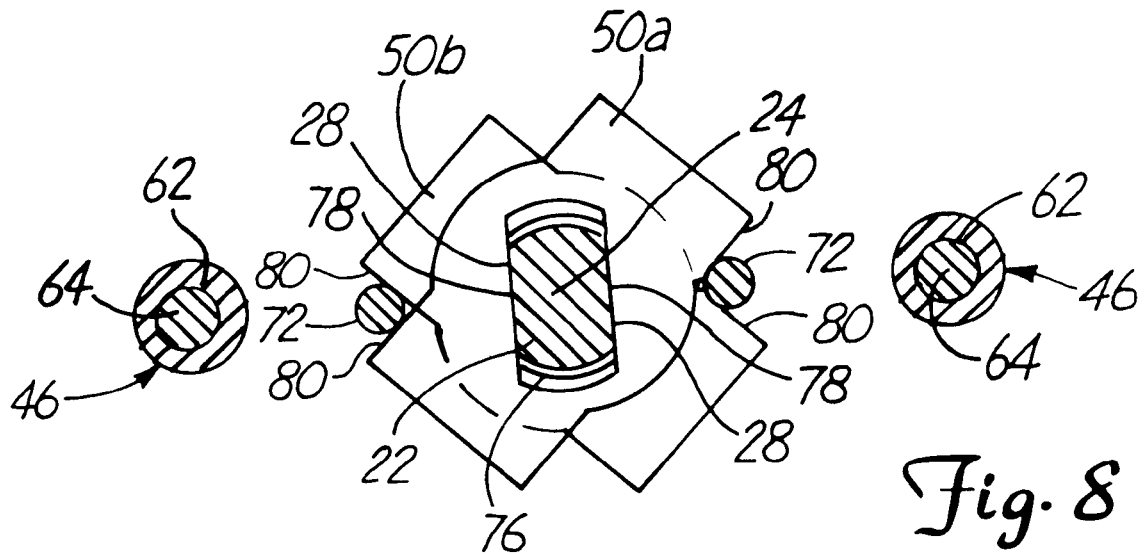
FIG. 8 is a cross-sectional view taken on line 8—8 of FIG. 1.
Figure 9:
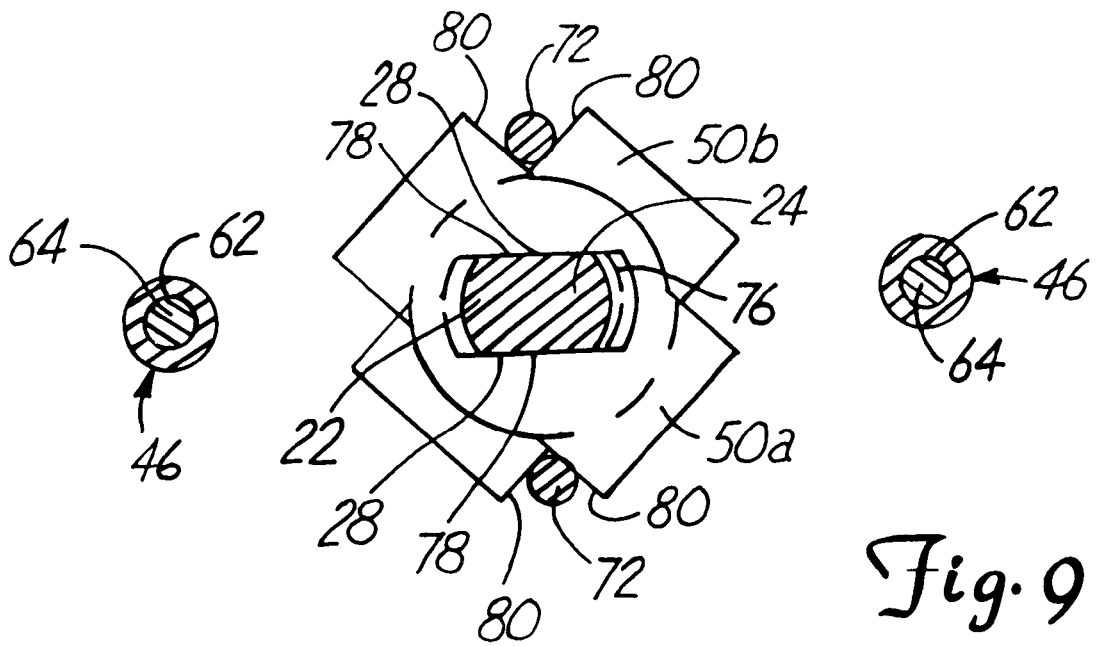
FIG. 9 is a view of FIG. 8 after 90° valve rotation.
Figure 10:
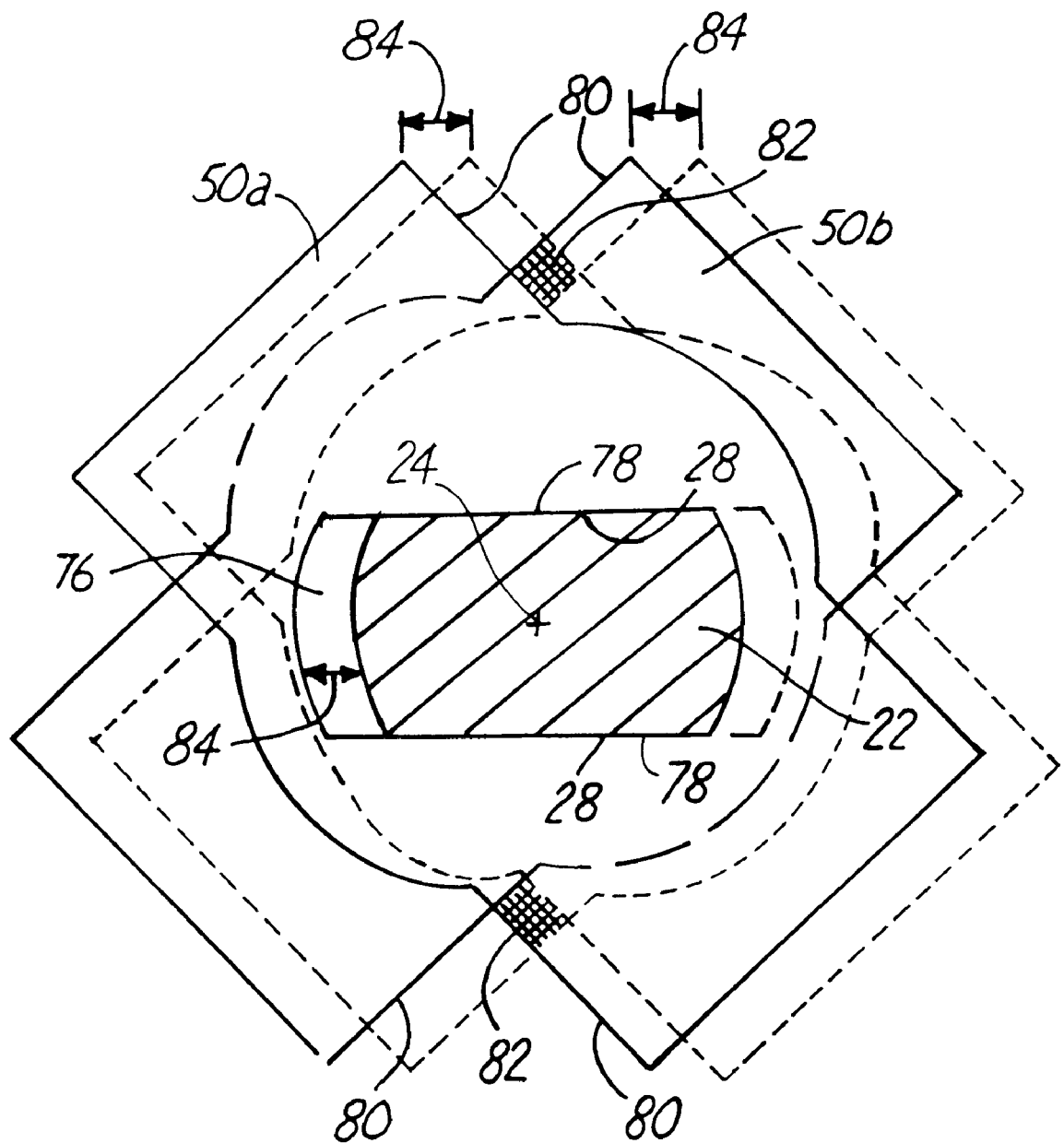
FIG. 10 shows the adjustability range of the drive plates of the present invention.

With the drive surface 80 to drive pin 72 contact, each drive plate 50 transfers torque from the drive pins 72 to the valve stem 22 when the valve stem 22 is turned in one direction. As shown in FIGS. 8–10, drive plate 50a transfers torque in a clockwise direction and drive plate 50b transfers torque in a counterclockwise direction. Alternatively, each drive plate could include a slot to receive each drive pin 72, with each slot having one clockwise drive surface and one opposing parallel counterclockwise drive surface which contact the drive pin 72 on opposing sides.

Each drive surface 80 is at an angle respective to the flats 78. The angle of the drive surface 80 with respect to the flats 78 is chosen based on the strength and frictional characteristics of the drive plates 50. For instance, in the preferred embodiment the drive surfaces 80 are at 45° angles relative to the flats 78. Because the drive surfaces 80 are at an angle respective to the flats 78, the dynamic adjustment freedom of the drive plate 50 allows the drive surfaces 80 to move relative to the valve stem axis 24. A greater angle of the drive surfaces 80 with respect to the flats 78 will decrease the force of contact between the drive pins 72 and the drive surfaces 80 required to transmit a given torque.

While the drive surface 80 may be somewhat curved, preferably the drive surface 80 is straight. The drive pin 72 is preferably cylindrical, providing a point contact between the drive pin 72 and any location on the straight drive surface 80. The tangential point contact between the drive pin 72 and the drive surface 80 helps to minimizes sliding friction between the drive pins 72 and the drive surfaces 80. Alternatively, one or all the drive pins 72 could have a flat disposed at the same offset and angle relative to the shaft axis 60 as the drive surface 80, and therefore mate and slide across the straight drive surface 80 along the drive pin flat.

Any change in alignment between the shaft axis 60 and the valve stem axis 24 will cause one or more drive plates 50 to slide relative to the valve stem 22 and perhaps relative to each other, and will cause the drive pins 72 to slide relative to one or more drive plates 50. Accordingly, frictional forces occur during dynamic adjustment between neighboring drive plates 50, between the drive plates 50 and the valve stem 22, and between the drive plates 50 and the drive pins 72. The frictional force between neighboring drive plates 50 can be minimized by providing sufficient clearance with the standoff 46 such that no axial load is carried by the drive plates 50. Slight frictional forces between the drive plates 50 and the valve stem 22 and between the drive plates 50 and the drive pins 72 is desired to counteract the effect of any play between the shaft 42 and the bearing hub 48. The amount of these frictional forces is dependent in part on the angle of the drive surface 80 with respect to the flats 78. A smaller angle of the drive surfaces 80 with respect to the flats 78 will increase the frictional forces between the drive plates 50 and the valve stem 22 and between the drive plates 50 and the drive pins 72. The frictional forces are also dependent on the materials and smoothness of the contacting surfaces of the valve stem 22, the drive plates 50, and the drive pins 72.

The clockwise and counterclockwise drive plates 50 may be mirror images of each other, such that both drive plates 50 may be identically formed and merely be flipped over respective to the valve stem 22 to determine whether the drive plate 50 transmits torque in a clockwise or a counterclockwise direction. With the mirror image drive plates 50 and straight drive surfaces 80 at a 45° angle to the flats 78, neighboring drive surfaces 80 are at angles of 45° and 135° relative to the flats 78, forming a drive pin receiving angle or a bearing "V" of 90°.

As best shown in FIG. 10, each drive plate 50 has a dynamic adjustment freedom between a far left position (shown in solid lines) and a far right position (shown in dashed lines). Movement of one or both drive plates 50 moves the drive surface 80 (i.e., moves each leg of the bearing "V" which receives the drive pin 72). Accordingly the drive plates 50 can receive the drive pin 72 at any location within a locus of possible locations for the point of the bearing "V", or "margin of misalignment error" 82, doubly cross-hatched in FIG. 10. With the shape of the drive plates 50 shown, the margin of misalignment error 82 has a diamond-shape. A greater angle of the drive surfaces 80 with respect to the flats 78 will increase the size of the diamond-shaped margin of misalignment error 82 in the radial direction (and correspondingly increase the potential length of contact between the drive surfaces 80 and the drive pin 72). The width of the diamond-shaped margin of misalignment error 82 is determined by the amount the length of the valve stem opening 76 in each drive plate 50 exceeds the diameter of the valve stem 22, shown by arrows 84. Workers skilled in the art will appreciate that different shapes of drive plates 50 will produce differently shaped margins of misalignment error 82. By alternatively placing the drive surfaces 80 at 90° relative to the flats 78, opposing drive surfaces would not cross to form a bearing "V", and the drive pins 72 would have quite extensive freedom for displacement in a radial direction.

As one "V" is moved by movement of the drive plates 50 relative to the valve stem axis 24 (without rotating the valve stem 22) to receive the drive pin 72 at a particular location, the opposing "V" (180° around the axes) is moved identically. Because of this, the rotational position of the valve stem 22 will always identically match the rotational position of the shaft 42, regardless of the amount and direction of offset between the shaft axis 60 and the valve stem axis 24.

The shape of the drive plates 50 shown provides four sets of possible drive surfaces 80 and thus four possible drive pin locations circumferentially spaced about the valve stem 22. Thus the shaft 42 and the drive pins 72 may be placed relative to the valve stem 22 either at a normally open or a normally closed position. Alternatively, a shaft having four drive pins 72 circumferentially spaced at 90° intervals may be used with the drive plates 50.

If multiple drive pins 72 are used, the drive pins 72 should be sized and spaced relative to the shaft axis 60 to correspond to the distance between the respective bearing "V"s, and the widths of the drive plates 50 should correspond to the distance between the drive pins 72. For example, if drive surfaces 80 of the drive plates 50 are at 45° to the opening flats 78 and each drive plate 50 is 0.75 inches wide, the distance between the points of the two opposing "V"s will be 0.75sin(45°)+0.75cos(45°)=1.061 inches. If both drive pins 72 have a ³⁄₃₂ inch radius, they should be spaced with their center points ³⁄₃₂sin(45°)+³⁄₃₂cos(45°)+1.061=1.326 inches apart. This spacing will provide continuous contact between both drive pins 72 and both drive surfaces 80 or legs of the respective bearing "V"s.

The drive plates 50 and drive pins 72 of the present invention also allow dynamic angular freedom of the shaft axis 60 relative to the valve stem axis 24. That is, the shaft flange 74 and/or the drive plates 50 need not be perpendicular to the valve stem axis 24, nor do the shaft flange 74 and the drive plates 50 need be parallel to each other. Rather, the drive pins 72 extends sufficiently in the longitudinal direction to still contact and turn the drive plates 50 even if there is an angular misalignment between the shaft 42 and the valve stem 22. For instance, the drive pins 72 may extend about ⅜ to ½ inch in the longitudinal direction, while the cumulative thickness of the drive plates 50 may be from ¼ to ⅜ inch.

The preferred coupling 40 includes three or more drive plates 50 such as the six drive plates 50 shown. When three or more drive plates 50 are used, they are preferably alternated between clockwise and counterclockwise orientations.

When three or more drive plates 50 are used and an angular misalignment is present, the "V"s between each set of neighboring drive plates 50 will occur at different locations within the margin of misalignment error 82. For instance, if the drive plates 50 have a thickness of 0.1 inches and there is an angular misalignment of 3° between the shaft axis 60 and the valve stem axis 24, then the "V"s between neighboring sets of drive plates 50 will be offset by (0.1) tan(3°)=0.005 inches. The maximum permissible angular misalignment between the shaft 42 and the valve stem 22 still retains each of the points of the bearing "V"s within the margin of misalignment error 82. As with the displacement adjustment freedom, the angular adjustment freedom is "dynamic" due to permissible sliding between the drive plates 50 and the valve stem 22 during rotation and due to permissible sliding between the drive pins 72 and the drive plates 50 during rotation. Because each of the drive plates 50 is dynamically self adjusting, torque will be equally shared between each of the like (i.e., clockwise or counterclockwise) drive plates 50 during rotation, regardless of any offset or angular misalignment.

Because the drive plates 50 will adjust themselves so as not to transmit bending moments or radial forces, the valve stem 22 avoids the stressing which occurred with prior coupling arrangements. Warping or breaking of the valve stem 22 is eliminated. Wear on the valve stem seal is only due to rotational friction, not due to a higher force on one side of the seal as compared to the other side. Without no bending moments exerted on the valve stem 22, the seals for the valves stem wear more evenly, wear is significantly retarded, and leakage problems are avoided. Because the present coupling system 40 transmits torque consistently through all rotational positions, there is no "binding" during turning, and the actuator 10 turns the valve 12 smoothly in direct response to the electrical input signal.

The drive plates 50 are preferably formed of a thermally insulative material. For instance, the drive plates 50 may be formed of a non-metallic material having a thermal conductivity less than about 0.1 cal/cm-sec-K. The preferred drive plates 50 are stamped out of 0.063 inch thick fiberglass sheet material, such as FR11 or GAROLITE G11 available from General Electric. The drive plates 50 preferably separate the shaft 42 from contact with the valve stem 22. The shaft 42 may be further designed to provide appropriate clearance for the valve stem 22, such as by having a valve stem opening 86, best shown in FIG. 2. The valve stem opening 86 may be for instance about ⅔ inches in diameter and about ⅕ inches deep.

In many valves, the valve stem 22 has a very direct thermal flow path to the valve element 20 and directly into the fluid flow. The thermal insulation of the drive plates 50 allows the shaft 42 and the actuator 10 to be thermally insulated relative to the valve stem 22. Absent such thermal insulation, a direct thermal flow path may exist between the actuator 10 and the valve stem 22. Particularly if cold fluids are being transferred through the valve 12, a direct thermal flow path can lead to cooling of the actuator parts. In a humid environment, cooling of the actuator parts can lead to condensation and associated corrosion and operation problems within the actuator 10. With the thermal insulation provided by the drive plates 50 in contact with the valve stem 22, the actuator 10 is thermally insulated from the valve stem 22.

The standoff 46 may also be formed of a non-metallic thermally insulative material to further insulate the actuator 10 from the valve 12. However, because the valve stem 22 generally has such a direct thermal flow path to the ball 20 and directly into the fluid flow, insulation with respect to the valve body 14 provided by the standoff 46 is not as significant as insulation with respect to the valve stem 22 provided by the drive plates 50. Accordingly, rather than make the entire standoff 46 of a non-metallic insulative material, thermal isolation washers may alternatively be used with a metal standoff 46. Either the standoff 46 or the thermal isolation washer may be formed, for example, out of the same thermally insulative material as the drive plates 50.

Different valves may have different sizes of valve stems 22, or different spacing between the attachment flange 30 and the valve stem 22. For instance, the coupler 40 of the present invention can be modified to fit a larger diameter valve stem 22 by merely using drive plates 50 each with an appropriately enlarged valve stem opening 76. The number of drive plates 50 used can be modified to accommodate longer or shorter valve stems 22. The axial length of the standoff 46, bearing 48, and/or shaft 42 can be changed to accommodate different spacing between the attachment flange 30 and the valve stem 22.

The coupler 40 of the present invention can also be provided as a retrofit kit which enables attachment to any of several standard valve sizes. For instance, the retrofit kit may include several drive plates 50 with a smaller valve stem opening 76 and several drive plates 50 with a larger valve stem opening 76. In use, the technician merely selects the drive plates 50 which are appropriately sized for the existing valve stem 22. The same shaft 42, bearing 48, standoff 46, bracket 44 and actuator 10 may be used in the retrofit kit regardless of the size of the valve stem 22.

Although the present invention has been described with reference to preferred embodiments, workers skilled in the art will recognize that changes may be made in form and detail without departing from the spirit and scope of the invention.

We claim:
1. An actuated valve, comprising:
 a rotary-driven valve comprising:
  a valve body;
  a valve element adjustably movable within the valve body for controlling flow through the valve body; and
  a valve stem extending from the valve body and rotatable about a valve stem axis, rotation of the valve stem moving the valve element, the valve stem having at least one flat;
 a rotary actuator providing torque for turning of the valve stem; and
 a rotary drive coupler coupling the rotary actuator to the rotary-driven valve, the rotary drive coupler comprising:
  a shaft received by the rotary actuator and rotated by the rotary actuator about a shaft axis, the shaft extending in a longitudinal direction;
  at least one drive element extending longitudinally from the shaft and offset relative to the shaft axis;
  a first plate having a valve stem opening mating with the flat of the valve stem and slidable parallel to the flat, the first drive plate contacting the drive element along a drive surface disposed at a first angle to the flat and permitting sliding movement between the drive element and the first drive plate, the first drive plate for transmitting torque from the shaft to the valve stem when the valve stem is rotated by the rotary actuator in at least one of a clockwise and a counterclockwise direction; and
  a second drive plate having a valve stem opening mating with the flat of the valve stem and slidable parallel to the flat, the second drive plate contacting the drive element along a drive surface disposed at a second angle to the flat and permitting sliding movement between the drive element and the second drive plate, the second drive plate for transmitting torque from the shaft to the valve stem when the valve stem is rotated by the rotary actuator in the other of the clockwise and the counterclockwise direction;

wherein sliding movement of the first and second drive plates relative to the valve stem and sliding movement of the drive element relative to the first and second drive plates allow the shaft axis to be dynamically misaligned relative to the valve stem axis.

2. The actuated valve of claim 1, wherein the valve stem openings permit sliding motion of the drive plates of at least 0.03 inches relative to the valve stem.

3. The actuated valve of claim 1, wherein the shaft comprises a head which extends through the actuator for manual rotation of the valve stem.

4. A rotary drive coupler for use between a rotary-driven valve having a valve stem with at least one flat and a rotary actuator providing torque for turning of the rotary-driven valve, the rotary drive coupler comprising:

a shaft adapted to be received by the rotary actuator and rotated by the rotary actuator about a shaft axis, the shaft extending in a longitudinal direction;

at least one drive element extending longitudinally from the shaft and offset relative to the shaft axis;

a first drive plate having a valve stem opening with an opening flat for mating with the flat of the valve stem, the first drive plate contacting the drive element along a drive surface disposed at a first angle to the opening flat and permitting sliding movement between the drive element and the first drive plate, the first drive plate for transmitting torque from the shaft to the valve stem when the valve stem is rotated by the rotary actuator in at least one of a clockwise and a counterclockwise direction; and a second drive plate having a valve stem opening with an opening flat for mating with the flat of the valve stem, the second drive plate contacting the drive element along a drive surface disposed at a second angle to the flat and permitting sliding movement between the drive element and the second drive plate, the second drive plate for transmitting torque from the shaft to the valve stem when the valve stem is rotated by the rotary actuator in the other of the clockwise and the counterclockwise direction;

wherein sliding movement of the first and second drive plates relative to the valve stem and sliding movement of the drive element relative to the first and second drive plates allow the shaft axis to be dynamically misaligned relative to the valve stem axis.

5. A rotary drive coupler for use between a rotary-driven valve having a valve stem with at least one flat and a rotary actuator providing torque for turning of the rotary-driven valve, the rotary drive coupler comprising:

a shaft adapted to be received by the rotary actuator and rotated by the rotary actuator about a shaft axis, the shaft extending in a longitudinal direction;

at least one drive element extending longitudinally from the shaft and offset relative to the shaft axis;

at least a first drive plate having a valve stem opening with an opening flat for mating with the flat of the valve stem, the first drive plate contacting the drive element along a drive surface disposed at a first angle to the opening flat and permitting sliding movement between the drive element and the first drive plate, the first drive plate for transmitting torque from the shaft to the valve stem when the valve stem is rotated by the rotary actuator in at least one of a clockwise and a counterclockwise direction; and a standoff for rotatably supporting the shaft relative to a flange of the rotary-driven valve;

wherein sliding movement of the drive plate relative to the valve stem and sliding movement of the drive element relative to the drive plate allow the shaft axis to be dynamically misaligned relative to the valve stem axis.

6. The rotary drive coupler of claim 5, wherein the standoff is mountable to the flange with a plurality of bolts, and further comprising:

a bracket for supporting the rotary actuator, the bracket mounted relative to the standoff with the plurality of bolts.

7. The rotary drive coupler of claim 5, wherein the standoff comprises a non-metallic insulator for restricting thermal conduction from the flange to the rotary actuator.

8. The rotary drive coupler of claim 4, wherein the shaft is isolated from contact with the valve stem by the first drive plate, and wherein the first drive plate is formed of a non-metallic material having a thermal conductivity less than about 0.1 cal/cm-sec-K.

9. The rotary drive coupler of claim 8, wherein the first drive plate is formed of sheet fiberglass.

10. The rotary drive coupler of claim 8, wherein the shaft comprises an opening about the shaft axis for receiving the valve stem therein without contact to the valve stem.

11. The rotary drive coupler of claim 4, wherein the first angle is 90° offset from the second angle, such that the drive surfaces of the first and second drive plates form a bearing "V" of 90° which is moveable relative to the valve stem axis.

12. The rotary drive coupler of claim 11, wherein the first angle is 45° and the second angle is 135°.

13. The rotary drive coupler of claim 4, comprising at least two drive elements circumferentially spaced around the shaft axis, wherein the first drive plate provides drive surfaces for each of the drive elements.

14. The rotary drive coupler of claim 4, wherein the valve stem opening has two opening flats opposing and parallel to each other for mating with a corresponding two parallel opposing flats of the valve stem.

15. The rotary drive coupler of claim 4 comprising a plurality of first drive plates and a plurality of second drive plates.

16. The rotary drive coupler of claim 15 wherein the first drive plates alternate with the second drive plates.

17. The rotary drive coupler of claim 4 wherein the first drive plate is a mirror image of the second drive plate, such that either a first drive plate or a second drive plate can be provided by flipping of the drive plate relative to the shaft axis.

18. In an actuated rotary-driven valve having a valve stem rotatable about a valve stem axis for moving a valve element, the valve stem having at least one flat, and a rotary actuator with a shaft coupling the rotary actuator to the valve stem for providing torque for turning of the valve stem, the improvement comprising:

at least one drive element extending from the shaft and offset relative to the shaft axis; and at least first and second drive plates between the shaft and the valve stem, each drive plate having a valve stem opening mating with the flat of the valve stem and separately slidable parallel to the flat, the first and second drive plates having opposing drive surfaces which contact the drive element for transmitting torque from the shaft to the valve stem, sliding of the first and second drive plates providing dynamic freedom in locating the opposing drive surfaces and the drive element relative to the valve stem axis.

19. The rotary drive coupler of claim 5, wherein the shaft comprises a head which extends through the actuator for manual rotation of the valve stem.

20. The rotary drive coupler of claim 5, wherein the shaft is isolated from contact with the valve stem by the first drive plate, and wherein the first drive plate is formed of a non-metallic material having a thermal conductivity less than about 0.1 cal/cm-sec-K.

* * * * *